(12) United States Patent
Ronda et al.

(10) Patent No.: US 8,492,724 B2
(45) Date of Patent: Jul. 23, 2013

(54) SCINTILLATING MATERIAL AND RELATED SPECTRAL FILTER

(75) Inventors: Cornelis Ronda, Aachen (DE); Herbert Schreinemacher, Baesweller (DE); Guenter Zeltier, Aachen (DE); Norbert Conrads, Raeren (DE); Simha Levene, Saad (IL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 13/057,483

(22) PCT Filed: Jul. 14, 2009

(86) PCT No.: PCT/IB2009/053056
§ 371 (c)(1),
(2), (4) Date: Mar. 9, 2011

(87) PCT Pub. No.: WO2010/015955
PCT Pub. Date: Feb. 11, 2010

(65) Prior Publication Data
US 2011/0180715 A1    Jul. 28, 2011

Related U.S. Application Data

(60) Provisional application No. 61/086,826, filed on Aug. 7, 2008.

(51) Int. Cl.
*G01T 1/20* (2006.01)
(52) U.S. Cl.
USPC .................................................... 250/361 R

(58) Field of Classification Search
USPC ........................................................ 250/361 R
See application file for complete search history.

(56) References Cited

U.S. PATENT DOCUMENTS

| | | | |
|---|---|---|---|
| 4,107,070 A | | 8/1978 | Everts et al. |
| 4,203,037 A | * | 5/1980 | Gur et al. .......................... 378/37 |
| 4,405,691 A | * | 9/1983 | Yale .............................. 428/690 |
| 4,863,882 A | * | 9/1989 | Matsuda et al. ................. 501/94 |
| 4,942,335 A | | 7/1990 | Mutsaers et al. |
| 5,302,817 A | | 4/1994 | Yokota et al. |
| 6,234,648 B1 | | 5/2001 | Borner et al. |
| 6,654,079 B2 | | 11/2003 | Bechtel et al. |
| 7,067,815 B2 | | 6/2006 | Dorenbos et al. |
| 7,102,135 B2 | | 9/2006 | Lecoq |
| 7,138,633 B1 | * | 11/2006 | Rozsa et al. .................. 250/368 |
| 7,202,598 B2 | | 4/2007 | Juestel et al. |
| 7,226,543 B2 | * | 6/2007 | Takagimi et al. ................. 252/1 |
| 7,230,248 B2 | * | 6/2007 | Fukuta et al. ............ 250/370.11 |
| 2001/0043042 A1 | | 11/2001 | Murazaki et al. |

FOREIGN PATENT DOCUMENTS

| | | |
|---|---|---|
| EP | 0088820 | 9/1983 |
| EP | 0533316 | 6/1992 |
| EP | 1132754 | 9/2001 |
| EP | 1291676 | 3/2003 |
| EP | 1489434 | 12/2004 |
| JP | 2000345154 | 12/2000 |
| WO | 2007004009 | 1/2007 |

* cited by examiner

Primary Examiner — Christine Sung

(57) ABSTRACT

A host lattice modified GOS scintillating material and a method for using a host lattice modified GOS scintillating material is provided. The host lattice modified GOS scintillating material has a shorter afterglow than conventional GOS scintillating material. In addition, a radiation detector and an imaging device incorporating a host lattice modified GOS scintillating material are provided.

26 Claims, 3 Drawing Sheets

SCINTILLATING MATERIAL AND RELATED SPECTRAL FILTER

CROSS REFERENCE TO RELATED APPLICATIONS

This application claims the benefit of U.S. provisional application Ser. No. 61/086,826 filed Aug. 7, 2008, which is incorporated herein by reference.

The present application relates generally to the imaging arts and more particularly to a scintillating material and a spectral filter for use with the scintillating material. The application subject matter finds particular use with x-ray based imaging systems, especially computed tomography (CT) imaging systems, and will be described with particular reference thereto. However, it could also be used in connection with other imaging systems, such as single-photon emission computed tomography (SPECT) or positron emission tomography (PET) imaging systems.

Computed tomography (CT) imaging systems typically employ an x-ray source that generates x-rays that traverse an examination region. A subject arranged in the examination region interacts with and absorbs a portion of the traversing x-rays. A radiation detector is arranged opposite the x-ray source to detect and measure intensities of the transmitted x-rays. The radiation detector typically includes several pixels, with each pixel including one or more blocks of scintillating material optically coupled to a photodetector. The scintillating material produces bursts of light, called scintillation events, in response to x-rays. The photodetector, such as a photodiode or photomultiplier, produces electrical signals indicative of the intensity of the scintillation events.

The performance of a scintillating material depends on many properties of the material, including for example its stopping power, brightness, and afterglow. Regarding afterglow in particular, a scintillator's afterglow is the persistence of excited light beyond the main emission. Afterglow may result from defects in the scintillator material, or impurities, or have other causes. Generally speaking, it is desirable to reduce a scintillator's afterglow. That is, an afterglow which is shorter in time is preferred to an afterglow which is longer in time. Similarly, an afterglow having a narrower wavelength spectrum is preferred to an afterglow having a broader wavelength spectrum. A smaller afterglow is advantageous because it increases the number of scintillation events which may be detected in a given time period, and also increases the temporal resolution of the detector.

As already mentioned, undesirable scintillator afterglow can result from impurities present in the scintillator material. Manufacturing a suitable scintillator for commercial use in a radiation detector is a complicated and expensive process. The process begins with gathering or synthesizing the requisite raw materials. The raw materials are typically processed to remove impurities. Unfortunately, some impurities are difficult to remove in a commercially or economically feasible manner. After the raw materials are gathered and purified to the extent practicable, they are then combined to form a scintillator. Crystalline scintillators are often formed by melting the raw materials together in a molten pool of material, which is then crystallized. Ceramic scintillators are often formed by pressing techniques and high temperature heat treatments, however, without melting the scintillator material. A scintillator may also be a composite material, comprising a mixture of a scintillating powder dispersed within a host medium such as a resin, wherein the scintillating powder and the host medium have a similar index of refraction.

Conventionally, gadolinium oxysulfide ($Gd_2O_2S$) (hereinafter "GOS") has been used as a scintillating material to detect x-rays in CT systems. GOS has a high light output and short afterglow in response to x-rays, in relation to many other scintillating materials. However, GOS may often have $Yb^{3+}$ impurities present, which can lead to undesirable afterglow as discussed further below.

According to one aspect of the present invention, a host lattice modified GOS scintillating material is provided. According to another aspect of the present invention, a method of using a host lattice modified GOS scintillating material is provided. In yet additional aspects of the present invention, a radiation detector and imaging device incorporating a host lattice modified GOS scintillating material are provided. The host lattice modified GOS scintillating material described herein has a shorter afterglow than conventional GOS scintillating material while still providing a relatively high light yield. Numerous additional advantages and benefits will become apparent to those of ordinary skill in the art upon reading the following detailed description of the preferred embodiments.

According to a further aspect of the present invention, a spectral filter is provided to reduce or substantially eliminate an unwanted portion of light produced by a scintillator. Such a filter may be used to reduce the effects of afterglow from the scintillator, such the $Yb^{3+}$ caused afterglow which may be present in a conventional GOS scintillating material or a host lattice modified GOS scintillating material.

The invention may take form in various chemical compositions, various components and arrangements of components, and in various process operations and arrangements of process operations. The drawings are only for the purpose of illustrating preferred embodiments and are not to be construed as limiting the invention.

Figure 4:
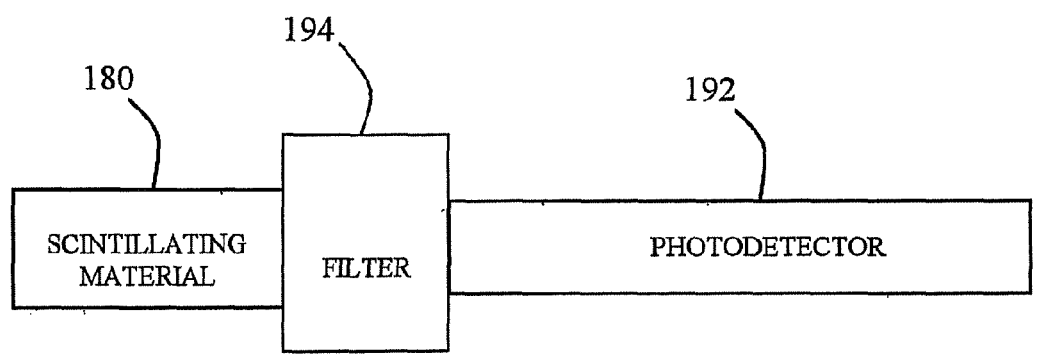
Figure 3:
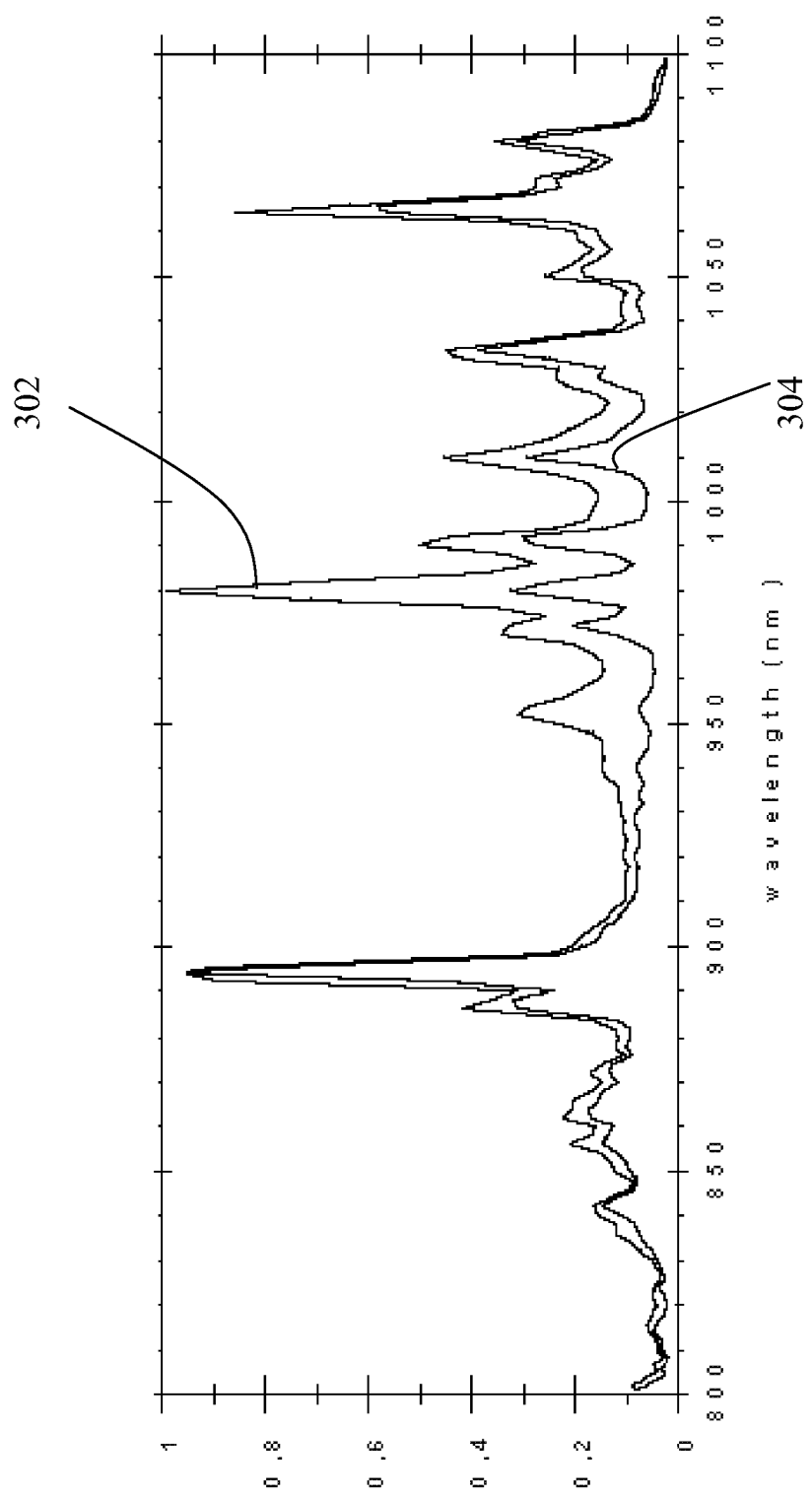

FIG. 3 compares a portion of the emission spectra of two GOS samples, one containing Yb impurities and the other lacking Yb impurities; and FIG. 4 is close up view of a portion of a scintillating material and one photodetector of a CT imaging system, with an optional spectral filter.

Figure 1:
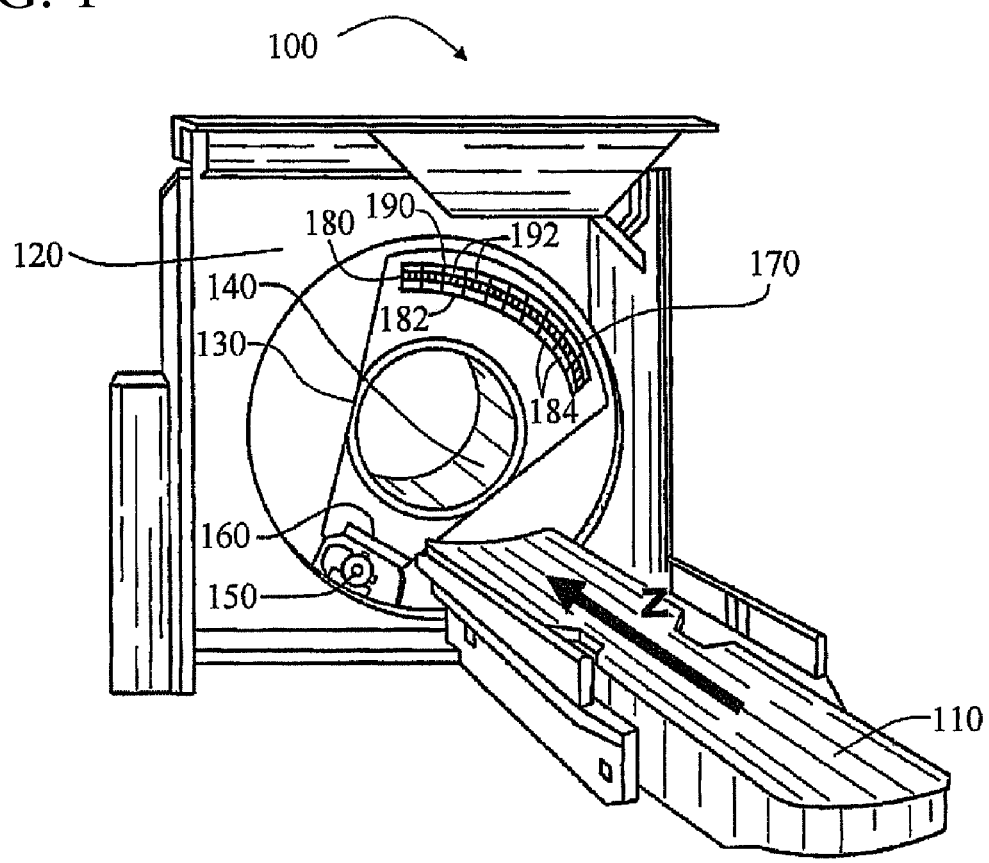
FIG. 1 is an exemplary CT imaging system, with a portion of the stationary gantry cut away to reveal the rotating gantry, x-ray source and radiation detector.

The medical imaging system and apparatus of the present application is generally any medical imaging system, for example, a CT, SPECT or PET imaging system. More specifically, with reference to FIG. 1, in an exemplary embodiment, the medical imaging system 100 is a CT imaging system. The CT imaging system 100 includes a subject support 110, such as a table or couch, which supports and positions a subject being examined and/or imaged, such as a patient. The CT imaging system 100 includes a stationary gantry 120 with a rotating gantry 130 mounted inside. A scanning tube 140 extends through the stationary gantry 120. The scanning tube 140 defines an examination region. The subject support 110 is linearly movable along a Z-axis relative to the scanning tube 140, thus allowing the subject support 110 and the imaged subject when placed thereon to be moved within and removed from the scanning tube 140.

The rotating gantry 130 is adapted to rotate around the scanning tube 140 (i.e., around the Z-axis) and the imaged subject when located therein. One or more x-ray sources 150 with collimator(s) 160 are mounted on the rotating gantry 130 to produce an x-ray beam directed through the scanning tube 140 and the imaged subject when located therein.

One or more radiation detector units 170 are also mounted on the rotating gantry 130. Typically, the x-ray source(s) 150 and the radiation detector unit(s) 170 are mounted on opposite sides of the rotating gantry 130 from one another and the rotating gantry 130 is rotated to obtain an angular range of projection views of the imaged subject. The radiation detector unit(s) 170 include a scintillating material 180. The scintillating material 180 may be, for example, a ceramic scintillating material. In some embodiments, the scintillating material 180 is a translucent ceramic. In some embodiments, the scintillating material 180 is made up of an array of individual crystals that are assembled together or cut from a common scintillator plate by photoetching or some other technique.

In various embodiments of the GOS material of the present invention, the GOS host lattice is modified by substituting yttrium, lanthanum and/or lutetium, or combinations thereof, for a portion of the gadolinium. For example, 25%, 50% or 75% or some other percentage of the gadolinium may be replaced by either yttrium, lanthanum and/or lutetium, or combinations thereof. TABLE 1 below reports the results of afterglow testing of such host lattice modified GOS samples which were doped with praseodymium and cerium. Each of the various modified GOS samples set forth in TABLE 1 are doped with approximately 700 mole ppm $Pr^{3+}$ and approximately 10 mole ppm $Ce^{3+}$. For comparison purposes, the same tests were applied to two conventional GOS samples, without any host lattice modifications, which were similarly doped.

TABLE 1

| Composition | Photodiode [ppm] | | | Photomultiplier [ppm] | | |
|---|---|---|---|---|---|---|
| | 5 ms | 500 ms | 2.1 s | 5 ms | 500 ms | 2.1 s |
| $(Gd_{0.75}Y_{0.25})_2O_2S$: Pr; Ce | 648 ± 44 | 59 ± 2 | 18 ± 1 | 492 ± 36 | 49 ± 2 | 16 ± 1 |
| $(Gd_{0.5}Y_{0.5})_2O_2S$: Pr; Ce | 962 ± 41 | 43 ± 2 | 15 ± 1 | 718 ± 43 | 33 ± 3 | 11 ± 1 |
| $(Gd_{0.25}Y_{0.75})_2O_2S$: Pr; Ce | 1195 ± 4 | 46 ± 4 | 13 ± 1 | 871 ± 57 | 34 ± 6 | 10 ± 1 |
| $(Gd_{0.75}La_{0.25})_2O_2S$: Pr; Ce | 1054 ± 6 | 5 ± 2 | 1 ± 1 | 955 ± 67 | 4 ± 3 | 2 ± 2 |
| $(Gd_{0.5}La_{0.5})_2O_2S$: Pr; Ce | 741 ± 33 | 8 ± 2 | 1 ± 1 | 643 ± 39 | 6 ± 2 | 1 ± 1 |
| $(Gd_{0.25}La_{0.75})_2O_2S$: Pr; Ce | 1681 ± 5 | 46 ± 6 | 10 ± 2 | 1542 ± 81 | 41 ± 7 | 9 ± 3 |
| $(Gd_{0.75}Lu_{0.25})_2O_2S$: Pr; Ce | 1820 ± 6 | 79 ± 3 | 22 ± 1 | 465 ± 40 | 19 ± 2 | 4 ± 1 |
| $(Gd_{0.5}Lu_{0.5})_2O_2S$: Pr; Ce | 1804 ± 1 | 125 ± 4 | 38 ± 1 | 162 ± 34 | 16 ± 3 | 3 ± 2 |
| $(Gd_{0.25}Lu_{0.75})_2O_2S$: Pr; Ce | 4467 ± 3 | 279 ± 32 | 77 ± 9 | 511 ± 54 | 18 ± 2 | 5 ± 1 |
| $Gd_2O_2S$: Pr; Ce | 1495 ± 4 | 242 ± 11 | 51 ± 3 | 1026 ± 50 | 171 ± 8 | 41 ± 2 |
| $Gd_2O_2S$: Pr; Ce | 1119 ± 4 | 246 ± 15 | 46 ± 6 | 941 ± 28 | 208 ± 11 | 36 ± 2 |

The CT imaging system 100 may include a grid 182, such as an anti-scatter grid, which is arranged on a radiation receiving face of the scintillating material 180. An array 190 of photodetectors 192, such as photodiodes or photomultipliers, is provided on the opposite side of the scintillating material 180 from the grid 182. Each of the photodetectors 192 is independently responsive to the scintillation events that occur in the corresponding section 184 of the scintillating material 180.

A computer (not shown) controls the operation of the CT imaging system 100, including the operation of the subject support 110 and rotating gantry 130. The data acquired by the detector unit(s) 170 is reconstructed to form an image that can optionally be displayed on the computer, using conventional methods.

Figure 2:
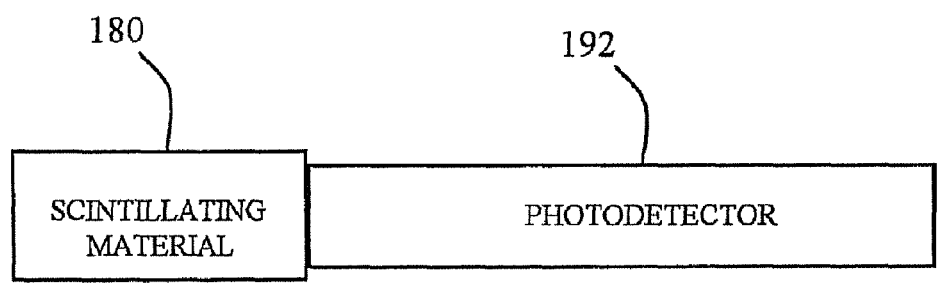
FIG. 2 is a close up view of a portion of the scintillating material and one photodetector of the CT imaging system of FIG. 1.

Referring now to FIG. 2, a close up view of a portion of the scintillating material 180 and one photodetector 192 is shown. The scintillating material 180 may be a GOS material with host lattice modifications. The host lattice modifications shorten the time duration of the afterglow with respect to conventional GOS material. The GOS material of the present invention is also doped with a doping agent. Some specific, non-limiting examples of doping agents that can be used are cerium (Ce) and praseodymium (Pr). Certain exemplary embodiments of the GOS material of the present invention may be doped with both cerium and praseodymium. For example, the GOS material may be doped with $Pr^{3+}$ concentrations between 100 and 1000 mole ppm and/or $Ce^{3+}$ concentrations between 0 and 50 mole ppm. However, different suitable doping agents may also be used.

The GOS material with host lattice modifications can be produced and used in the same manner as conventional GOS material. Wafer, blank and array production can be performed using the same equipment as used in conventional GOS production.

As can be seen, the afterglow of the samples was separately measured with a photodiode and with a photomultiplier. First, a tested sample was exposed to a standard x-ray source for a standard amount of time to cause the sample to luminesce. The x-ray source was then shut off or removed. The sample's brightness or intensity was then measured at 5 milliseconds, 500 milliseconds, and 2.1 seconds after removal of the x-ray source. The intensity values reported in the table are in parts per million relative to a unit of 1, which represents the initial intensity of the sample when the x-ray source was removed.

Thus, for example, after 5 milliseconds the intensity of $(Gd_{0.75}Y_{0.25})_2O_2S$:Pr; Ce as measured with a photodiode was reduced to about 0.000648 of its original value. In contrast, after 5 milliseconds the intensities of the two conventional GOS samples as measured with the photodiode were respectively reduced only to about 0.001495 and 0.001119 of their original values. So, the afterglow of that modified GOS sample was substantially less than the afterglow of the conventional GOS after 5 milliseconds.

TABLE 1 above thus illustrates the reduction of the afterglow intensity of various compositions of GOS material with host lattice modifications as compared to conventional GOS material. Each of the host lattice modified GOS samples exhibited a shorter afterglow time than conventional GOS material, except for the lutetium GOS samples as measured by the photodiode. It is believed that the disparity in those samples is due to the contamination of $Lu_2O_3$ with $Yb_2O_3$ in the raw materials used to generate the modified GOS. That contamination leads to ytterbium ($Yb^{3+}$) impurities in the resulting modified GOS scintillator, and that impurity can increase the afterglow in conventional GOS as well as host lattice modified GOS.

For example, FIG. 3 compares the emission spectra of a first conventional GOS sample 302 containing $Yb^{3+}$ impurities on the order of a few parts per million, and a second conventional GOS sample 304 from which substantially all $Yb^{3+}$ impurities have been removed. The main and desired spectrum is green-red visible light, and is present in both samples. However, as can be seen, the $Yb^{3+}$ impurities lead to a significantly greater emission of the first conventional GOS sample 302 in the infrared region, between about 940 and 1100 nm. Unfortunately, manufacturing GOS as pure as the second sample 304 reflected in FIG. 3 can be expensive, especially in commercially significant quantities.

Turning back to TABLE 1, it can be seen that the photomultiplier was much less sensitive to the longer afterglow of the lutetium-modified GOS samples than the photodiode was. The photomultiplier used a cut-off wavelength of 800 nm as an upper limit, so it measured only wavelengths below infrared light. The photodiode, on the other hand, also measured infrared light. Thus the infrared region afterglow resulting from $Yb^{3+}$ impurities explains the disparity between the photomultiplier results (which did not measure infrared light) and the photodiode results (which measured infrared light).

To improve the performance of GOS—such as for example the lutetium-modified GOS as measured with a photodiode—a spectral filter may be employed. As shown in FIG. 4, a spectral filter 194 may be placed in the optical path between a scintillator material 180 and a photodetector 192. The spectral filter 194 operates to remove an undesired portion of the scintillator material emission while transmitting a desired part of the scintillator material emission. For example, when the scintillator material is GOS, the spectral filter 194 may transmit wavelengths below about 900 nm (including the desired green-red light) while blocking out higher wavelengths (including the undesired infrared light). Such short wavelength pass filters may be produced by deposition of transparent layers with alternating low and high refractive indexes.

A spectral filter 194 may be inserted in the optical path between a scintillator material 180 and a photodetector 192 in a variety of manners, such as the following representative examples. Conventional detectors often have a layer of optical cement disposed between the scintillator material 180 and the photodetector 192, in order to firmly hold the two components together and transmit light from the scintillator 180 to the photodetector 192. The spectral filter 194 may be placed within such a layer of optical cement. As another alternative, conventional systems also often have an optical coating on the photodetector 192 to enhance the sensitivity spectrum of the photodetector 192. The spectral filter 194 may be formed from additional coating(s) placed on the photodetector 192.

As yet another alternative particularly suited to a composite scintillator material, a small amount of a soluable light absorber or dye may be incorporated within the host medium. The light absorber acts as a filter by absorbing the undesired spectra and not absorbing the desired spectra. Preferably, the light absorber is sufficiently radiation hard.

The spectral filter 194 may take many forms. For example, it may be an absorbing filter which absorbs the undesired afterglow light. As another example, the spectral filter 194 may be a reflecting filter which reflects the undesired afterglow light. Many types of filters are known which would be suitable for this application, such as glass filters, interference filters, diffraction grating filters, prisms, and the like.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof. The invention may take form in various chemical compositions, components and arrangements, combinations and sub-combinations of the elements of the disclosed embodiments.

The invention claimed is:

1. A scintillating material comprising a modified GOS material for use with an imaging device, wherein at least about 25% and no more than about 75% of the gadolinium (Gd) of the GOS material is replaced with lanthanum (La).

2. The scintillating material of claim 1, wherein at least about 50% of the gadolinium (Gd) is replaced with lanthanum (La).

3. The scintillating material of claim 1, wherein a portion of the gadolinium (Gd) of the GOS material is replaced with at least one element selected from the group consisting of yttrium (Y) and lutetium (Lu).

4. A radiation detector comprising the scintillating material of claim 1 and a photodetector optically coupled to the scintillating material.

5. The radiation detector of claim 4, further comprising a spectral filter disposed in an optical path between the scintillating material and the photodetector.

6. An imaging device comprising the radiation detector of claim 4 and at least one radiation source.

7. The imaging device of claim 6, wherein the imaging device comprises a CT imaging device.

8. The scintillating material of claim 1, wherein the modified GOS material is crystalline.

9. The scintillating material of claim 1, wherein the modified GOS material is a ceramic.

10. The scintillating material of claim 1, further comprising at least one of cerium (Ce) and praseodymium (Pr) as a doping agent.

11. The scintillating material of claim 10, wherein the doping agent comprises cerium (Ce) having a concentration between 0 and 500 mole ppm.

12. The scintillating material of claim 10, wherein the doping agent comprises praseodymium (Pr) having a concentration between 100 and 1000 mole ppm.

13. A scintillating material comprising a modified GOS material for use with an imaging device, wherein at most about 50% of the gadolinium (Gd) of the GOS material is replaced with lutetium (Lu).

14. The scintillating material claim 13, wherein at most about 25% of the gadolinium (Gd) is replaced with lutetium (Lu).

15. The scintillating material of claim 13, wherein a portion of the gadolinium (Gd) of the GOS material is replaced with at least one element selected from the group consisting of yttrium (Y) and lanthanum (La).

16. A radiation detector comprising the scintillating material of claim 13 and a photodetector optically coupled to the scintillating material.

17. The radiation detector of claim 16, further comprising a spectral filter disposed in an optical path between the scintillating material and the photodetector.

18. The radiation detector of claim 17, wherein the spectral filter is adapted to substantially block infrared light emitted from the scintillating material.

19. The radiation detector of claim 17, wherein the spectral filter is adapted to substantially block light having a wavelength of greater than about 900 nm.

20. An imaging device comprising the radiation detector of claim 16 and at least one radiation source.

21. The imaging device of claim 20, wherein the imaging device comprises a CT imaging device.

22. The scintillating material of claim 13, wherein the modified GOS material is crystalline.

23. The scintillating material of claim 13, wherein the modified GOS material is a ceramic.

24. The scintillating material of claim 13, further comprising at least one of cerium (Ce) and praseodymium (Pr) as a doping agent.

25. The scintillating material of claim 24, wherein the doping agent is cerium (Ce) having a concentration between 0 and 500 mole ppm.

26. The scintillating material of claim 24, wherein the doping agent is praseodymium (Pr) having a concentration between 100 and 1000 mole ppm.

\* \* \* \* \*